United States Patent
Watanabe et al.

(10) Patent No.: US 8,239,691 B2
(45) Date of Patent: *Aug. 7, 2012

(54) DATA STORAGE DEVICE AND MANAGEMENT METHOD OF CRYPTOGRAPHIC KEY THEREOF

(75) Inventors: Yoshiju Watanabe, Kanagawa (JP); Toshio Kakihara, Kanagawa (JP)

(73) Assignee: Hitachi Global Storage Technologies, Netherlands B.V., Amsterdam (NL)

(*) Notice: Subject to any disclaimer, the term of this patent is extended or adjusted under 35 U.S.C. 154(b) by 985 days.

This patent is subject to a terminal disclaimer.

(21) Appl. No.: 12/079,699

(22) Filed: Mar. 27, 2008

(65) Prior Publication Data

US 2010/0031061 A1 Feb. 4, 2010

(30) Foreign Application Priority Data

Mar. 28, 2007 (JP) .................. 2007-085449

(51) Int. Cl.
*G06F 12/14* (2006.01)
(52) U.S. Cl. ........ 713/193; 713/189; 713/184; 713/182; 726/5; 726/4; 726/2

(58) Field of Classification Search .............. None
See application file for complete search history.

(56) References Cited

U.S. PATENT DOCUMENTS

| | | | |
|---|---|---|---|
| 2004/0172538 A1 | 9/2004 | Satoh et al. | |
| 2004/0250103 A1* | 12/2004 | Yokosawa | 713/193 |
| 2005/0021948 A1* | 1/2005 | Kamperman | 713/165 |
| 2006/0242068 A1* | 10/2006 | Jogand-Coulomb et al. | 705/50 |

* cited by examiner

Primary Examiner — Pramila Parthasarathy

(57) ABSTRACT

Embodiments of the present invention help to securely manage a data cryptographic key in a data storage device. In an embodiment of the present invention, a cryptographic processor for encrypting and decrypting data is located between a host interface and a memory manager. In parts of the hard disk drive (HDD), except for the host interface, the HDD handles user data in an encrypted state. A data cryptographic key which the cryptographic processor uses to encrypt and decrypt the user data is encrypted and stored in a magnetic disk. A multiprocessing unit (MPU) decrypts the data cryptographic key using a password and a random number to supply it to the cryptographic processor. Using the password and the random number, the HDD can manage the data cryptographic key with more security.

10 Claims, 10 Drawing Sheets

| 111a | 111b | 111c | 111d |
|---|---|---|---|
| Dkey_1 | Dkey_2 | Dkey_3 | Dkey_4 |
| Ekey_1 | Ekey_2 | Ekey_3 | Ekey_4 |
| E{Ekey_1, Dkey_1} | E{Ekey_2, Dkey_2} | E{Ekey_3, Dkey_3} | E{Ekey_4, Dkey_4} | ns
DATA STORAGE DEVICE AND MANAGEMENT METHOD OF CRYPTOGRAPHIC KEY THEREOF

CROSS-REFERENCE TO RELATED APPLICATION

The instant nonprovisional patent application claims priority to Japanese Patent Application No. 2007-085449 filed Mar. 28, 2007 and which is incorporated by reference in its entirety herein for all purposes.

BACKGROUND OF THE INVENTION

As media for storing data, various schemes have been known: such as optical disks, magneto-optical disks, magnetic disks, and semiconductor memories. In a data storage device for storing data using such a medium, in order to protect user data stored in the medium from an unauthorized access, a technique for encrypting user data has been known. For example, Japanese Patent Publication No. 2004-201038 ("Patent Document I") discloses an example of such a technique to encrypt data stored in a magnetic disk in a hard disk drive (HDD) which uses the magnetic disk as a medium.

Specifically, the HDD comprises a cryptographic processor for encrypting and decrypting data. The cryptographic processor encrypts data recorded on a magnetic disk and decrypts data reproduced from the magnetic disk at a data transfer rate, respectively. This HDD generates a data cryptographic key for encrypting and decrypting user data by encrypting personal identification information (for example, a password).

Moreover, the HDD encrypts the password with a data cryptographic key and stores the encrypted password as authentication data within the HDD. In authenticating a user, the HDD compares the stored authentication data and an encrypted result by the data cryptographic key generated from the input password and verifies the conformance between them. If the user authentication succeeds, the HDD generates a data cryptographic key and uses it to encrypt and decrypt the user data on the magnetic disk.

The Patent Document 1 discloses another method. This method generates data cryptographic keys for encrypting and decrypting data individually. The HDD further encrypts the data cryptographic key with an authentication cryptographic key made by encrypting a password and keeps it within the HDD. In using the HDD, the HDD conducts an authentication of the user and if he or she is a normal user, it decrypts the data cryptographic key retained in the HDD and encrypted with the authentication cryptographic key generated by the inputted password to use the data cryptographic key for encrypting and decrypting the data in the magnetic disk.

If the HDD does not properly manage the data cryptographic key for encrypting and decrypting data, however, it cannot take advantage of the function of encrypting data sufficiently. Although Patent Document 1 discloses a management method, it is hard to say that the method is sufficient in security. The management method of Patent Document 1 generates a key cryptographic key from personal identification information (such as a password) and encrypts a data cryptographic key using the key cryptographic key.

Therefore, in the key management of data cryptographic key, the key cryptographic key and the password are always in a one-by-one relationship. Changing the management state of the data cryptographic key (encrypted data cryptographic key) for higher security in the data cryptographic key requires a change of the password. Consequently, a technique to manage the data cryptographic key with higher security will be required in a data storage device.

BRIEF SUMMARY OF THE INVENTION

Embodiments of the present invention help to securely manage a data cryptographic key in a data storage device. According to the embodiment shown in FIG. 2, a cryptographic processor 234 for encrypting and decrypting data is located between a host interface 231 and a memory manager 233. In parts of the hard disk drive (HDD) 1, except for the host interface 231, the HDD 1 handles user data in an encrypted state. A data cryptographic key which the cryptographic processor 234 uses to encrypt and decrypt the user data is encrypted and stored in a magnetic disk 11. A multi-processing unit (MPU) 235 decrypts the data cryptographic key using a password and a random number to supply it to the cryptographic processor 234. Using the password and the random number, the HDD 1 can manage the data cryptographic key with more security.

DETAILED DESCRIPTION OF THE INVENTION

Figure 1:
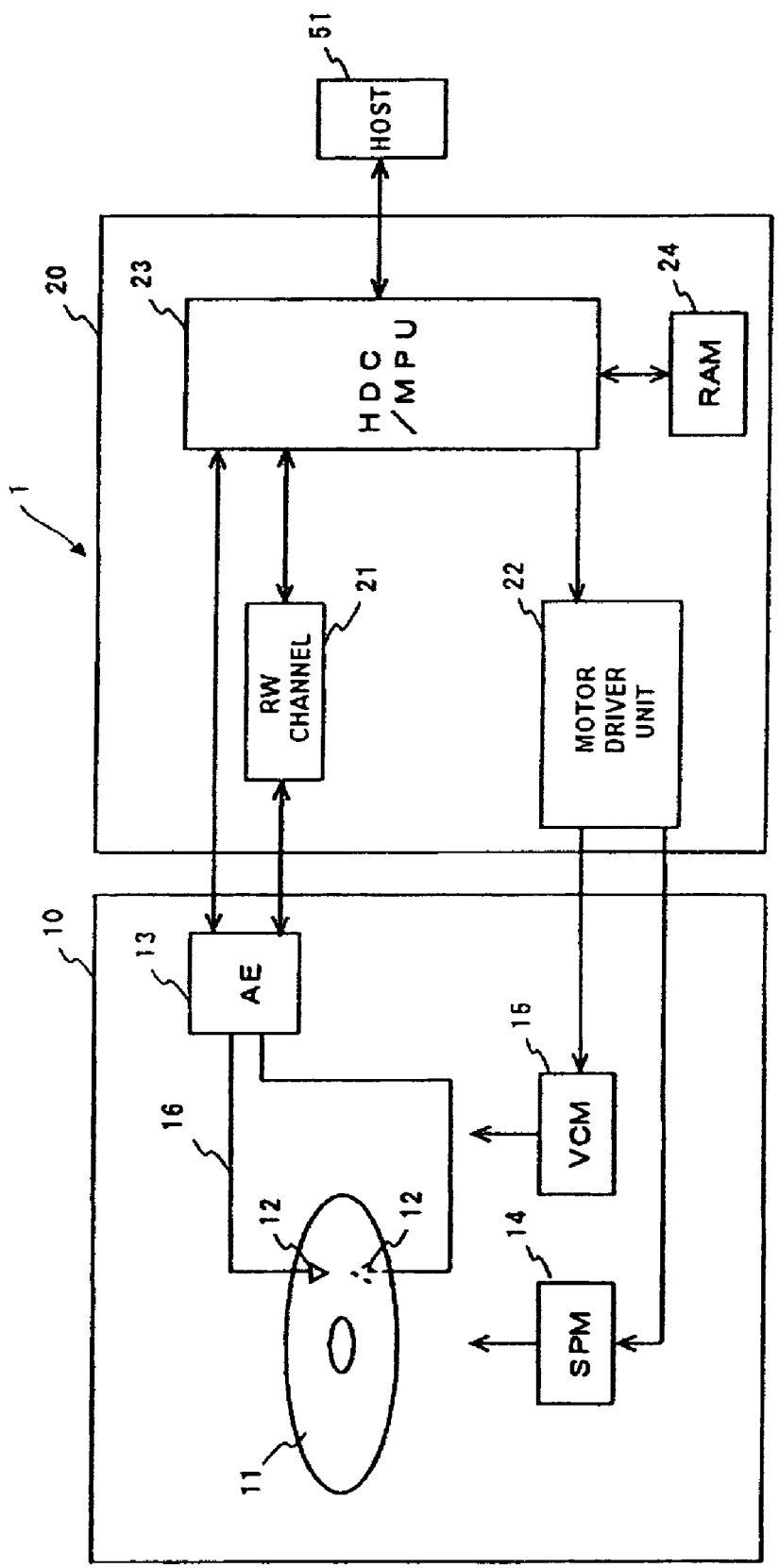
FIG. 1 is a block diagram schematically showing the entire configuration of an HDD according to one embodiment.

Embodiments of the present invention relate to a data storage device and a management method of a cryptographic key thereof, and more particularly, relate to a scheme to encrypt a data cryptographic key stored in a medium.

An aspect of embodiments of the present invention is a data storage device performing cryptographic operation to data in a medium. This data storage device comprises a medium for storing data, a key cryptographic processor for generating a key cryptographic key using external key generation data received from a host and internal key generation data stored inside the device and decrypting a data cryptographic key stored inside the device in an encrypted state using the key cryptographic key, a data cryptographic processor for performing cryptographic operation on data in the medium using the decrypted data cryptographic key. Generating the key cryptographic key using the external key generation data and the internal key generation data enables management of the data cryptographic key to be more secure.

The data storage device may further comprise an authentication processor for performing authentication using the external key generation data as a password and the key cryptographic processor generates the key cryptographic key using the password used in the authentication if the authentication has been normally performed. This improves the security. Moreover, in one example, if the password is updated, the key cryptographic processor generates the key cryptographic key with the updated password and the updated internal key generation data and encrypts the data cryptographic key using the key cryptographic key. Updating the password and the internal data improves the security.

The data storage device may further comprise a random number generator and the internal key generation data is a random number generated by the random number generator. Generating the random number as the internal key generation data inside the device achieves generation of a key cryptographic key in a random manner to improve the security.

Preferably, the key cryptographic processor updates the key cryptographic key changing the internal key generation data. This improves security. Moreover, it may be desirable that if the encrypted and stored data cryptographic key is accessed from an external, the key cryptographic processor updates the key cryptographic key changing the internal key generation data.

A data storage region of the medium may have a plurality of divided sections and a data cryptographic key corresponding to each of the plurality of sections is encrypted and stored inside the device using a key cryptographic key generated from each different internal key generation data. This improves the security.

Another aspect of embodiments of the present invention is a managing method of a data cryptographic key in a data storage device performing cryptographic operation of data in a medium. This method receives external key generation data from a host. It generates a key cryptographic key using the external key generation data and internal key generation data stored inside the device. It decrypts a data cryptographic key stored inside the device in an encrypted state using the key cryptographic key. It performs cryptographic operation of data in a medium using the decrypted data cryptographic key. Generating the key cryptographic key using the external key generation data and the internal key generation data enables management of the data cryptographic key to be securer.

Embodiments of the present invention can properly manage the data cryptographic key in a data storage device and more reliably avoid data leakage from the data storage device.

Hereinafter, particular embodiments applicable to the present invention will be described. For clarity of explanation, the following description and the accompanying drawings contain omissions and simplifications as appropriate. Throughout the drawings, like components are denoted by like reference numerals, and their repetitive description is omitted if not necessary. Hereinbelow, embodiments of the present invention will be described by way of example of a hard disk drive (HDD) as an example of a disk drive device. A feature of one embodiment is management of a data cryptographic key in an HDD to encrypt data stored in a magnetic disk.

First, an entire configuration of an HDD is outlined. FIG. 1 is a block diagram schematically showing the entire configuration of an HDD 1. The HDD 1 includes a circuit board 20 fixed outside of an enclosure 10. On the circuit board 20, circuits such as a read-write channel (RW channel) 21, a motor driver unit 22, a hard disk controller (HDC) and an integrated circuit of MPU (HDC/MPU) 23 as a logic circuit, and a RAM 24 are implemented.

In the enclosure 10, a spindle motor (SPM) 14 rotates a magnetic disk 11 at a specific angular rate. The magnetic disk 11 is a medium for storing data. The motor driver unit 22 drives the SPM 14 in accordance with control data from the HDC/MPU 23. Each head slider 12 includes a slider flying over the magnetic disk and a head element portion which is fixed to the slider and converts magnetic signals and electric signals (reading and writing data). Each head slider 12 is fixed to a tip end of an actuator 16. The actuator 16, which is coupled to a voice coil motor (VCM) 15, pivots about the pivotal axis to move the head slider 12 above the magnetic disk 11 in its radial direction.

The motor driver unit 22 drives the VCM 15 in accordance with control data from the HDC/MPU 23. An arm electronics (AE) 13 selects a head slider 12 to access (read from or write to) the magnetic disk 11 from a plurality of head slider 12 in accordance with control data from the HDC/MPU 23 and amplifies read/write signals.

The RW channel 21, in a read process, amplifies read signals supplied from the AE 13 to a specific amplitude, and then extracts data from the obtained read signals to perform a decoding process. The decoded data are supplied to the HDC/MPU 23. The RW channel 21, in a write process, code-demodulates write data supplied from the HDC/MPU 23 and further converts the code-modulated data into write signals to supply them to the AE 13.

In the HDC/MPU 23 as an example of a controller, the MPU operates in accordance with firmware loaded in the RAM 24. The HDC/MPU 23 performs entire control of the HDD 1 in addition to necessary processes concerning data processes such as read/write process control, order management of command execution, head positioning control using servo signals (servo control), interface control to and from a host 51, defect management, error handling, and the like.

Figure 2:
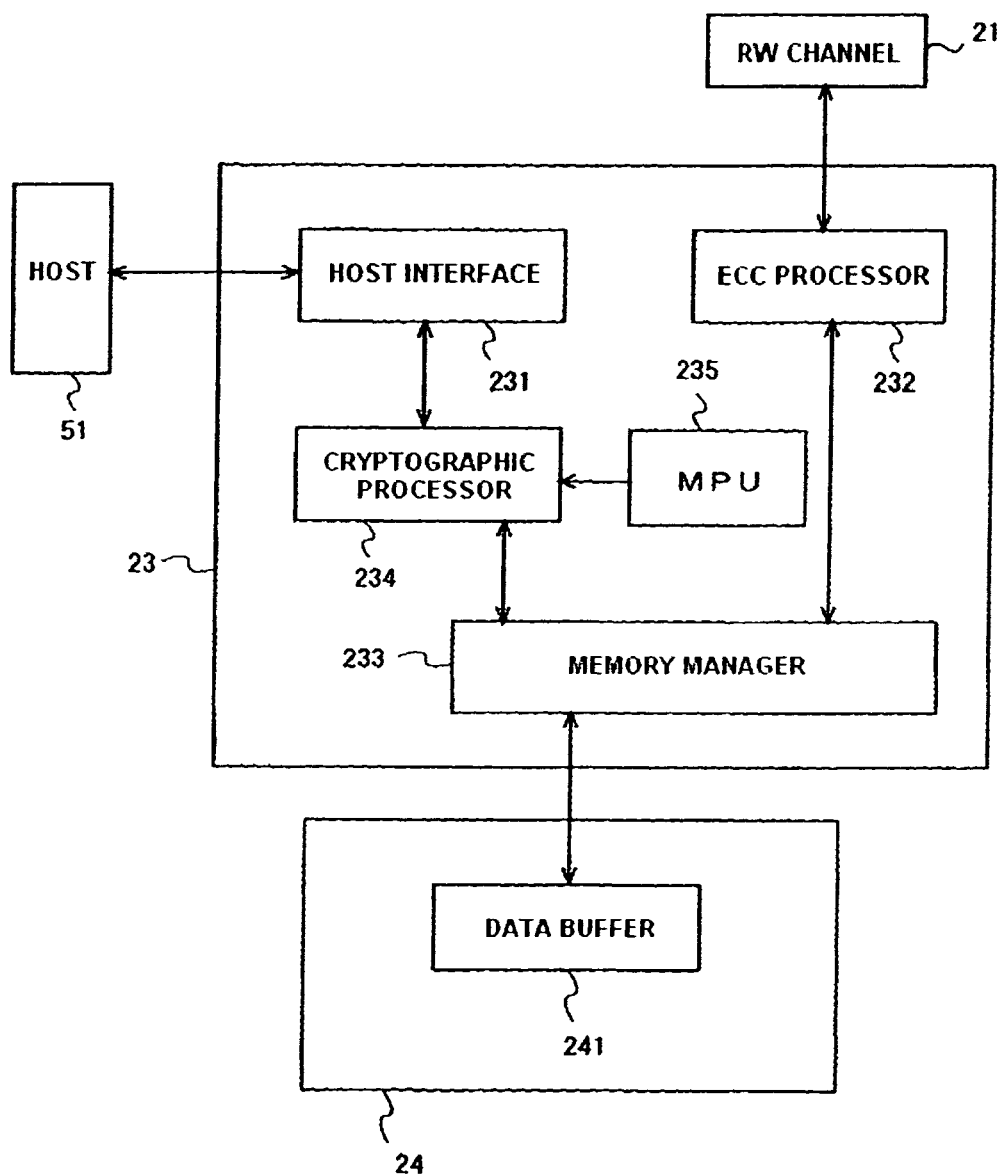
FIG. 2 is a block diagram schematically showing the components relating to the cryptographic operation according to one embodiment.

The HDC/MPU 23 according to one embodiment carries out cryptographic operations of user data recorded on the magnetic disk 11. FIG. 2 is a block diagram schematically showing components relating to the cryptographic operation. The HDC/MPU 23 comprises a host interface 231, an ECC processor 232, a memory manager 233, and a cryptographic processor 234. These are configured by logic circuits. The HDC/MPU 23 contains an MPU 235 working in accordance with firmware.

The host interface 231 is an interface for data communication to and from the external host 51. The ECC processor 232 performs error detection and error correction on recorded data on the magnetic disk 11. The memory manager 233 performs data flow control, access control to a memory bus, and the like. The cryptographic processor 234 encrypts and decrypts user data on the magnetic disk 11. The data buffer 241 provided in the RAM 24 temporarily stores write data and read data.

In a write operation, write data from the host 51 are transferred to the cryptographic processor 234 via the host interface 231. The cryptographic processor 234 encrypts the write data and sends it to the memory manager 233. The memory manager 233 stores the encrypted write data in the data buffer 241. The memory manager 233 then obtains the write data from the data buffer 241 and sends it to the ECC processor 232. The ECC processor 232 performs necessary operations for error correction on the write data and sends it to the RW channel 21.

In a read operation, the ECC processor 232 performs error correction of read data from the magnetic disk 11 transferred from the RW channel 21. Then, the read data is stored in the data buffer 241 via a memory manager 233. The memory manager 233 obtains the read data from the data buffer 241 and sends it to the cryptographic processor 234. The cryptographic processor 234 decrypts the read data. The decrypted read data is transferred to the host 51 via a host interface 231.

As shown in FIG. 2, the cryptographic processor 234 for encrypting and decrypting data is located between the host interface 231 and the memory manager 233. Therefore, the HDD 1 can handle user data in an encrypted state in the parts other than the host interface 231 in the HDD 1. That is to say, the user data in the data buffer 241 are protected by encryption during operation of the HDD 1.

The data cryptographic key which the cryptographic processor 234 uses in encrypting and decrypting the user data is reproduced (decrypted) by the MPU 235 based on data stored on the magnetic disk 11 and is supplied to the cryptographic processor 234. Hereinbelow, the management method of the data cryptographic key will be described. Major points of the management method of the key to encrypt and decrypt data according to the present embodiment are as follows.

The MPU 235 generates a key cryptographic key EKey using a password for user authentication obtained from the host 51 and a random number data RSx on the magnetic disk 11. This key cryptographic key EKey is used in a cryptographic operation of a data cryptographic key DKey which is used in a cryptographic operation of user data. The MPU 235 encrypts the data cryptographic key DKey using the key cryptographic key EKey. The encrypted data cryptographic key is denoted by E{EKey, DKey}. That is, E{EKey, DKey} represents that the data cryptographic key DKey is encrypted with the key cryptographic key EKey. The encrypted data cryptographic key E{EKey, DKey} is stored on magnetic disk 11.

The MPU 235 generates the key cryptographic key EKey to reproduce (decrypt) the data cryptographic key DKey based on the password for user authentication inputted from the host 51 and the random number data RSx on the magnetic disk 11. The MPU 235 further retrieves the encrypted data cryptographic key E{EKey, DKey} to release the encryption (decrypt) with the key cryptographic key EKey.

The above management method can change the password for authentication, retaining securely the data cryptographic key DKey as the encrypted data cryptographic key E{EKey, DKey}. Besides, periodically updating the random number data RSx as necessary updates the encrypted data cryptographic key E{EKey, DKey}, which achieves securer management of the data cryptographic key DKey. In the present embodiment, the MPU 235 can change the password for user authentication, the data cryptographic key DKey, and the random number data RSx according to a command from the host 51, which achieves securer management of the data cryptographic key DKey.

Hereinbelow, each of a plurality of sequences in the management of the data cryptographic key will be described in detail referring to FIGS. 3 to 9. Each of the drawings illustrates the management method of the data cryptographic key DKey used in the cryptographic processor 234, and shows handling of the data cryptographic key DKey in each state of the HDD 1. The cryptographic method used by the cryptographic processor 234 is assumed to be a common key encryption scheme (secret key encryption scheme) such as an advanced encryption standard (AES). The management of a key according to one embodiment may be applied to other encryption schemes.

Figure 3:
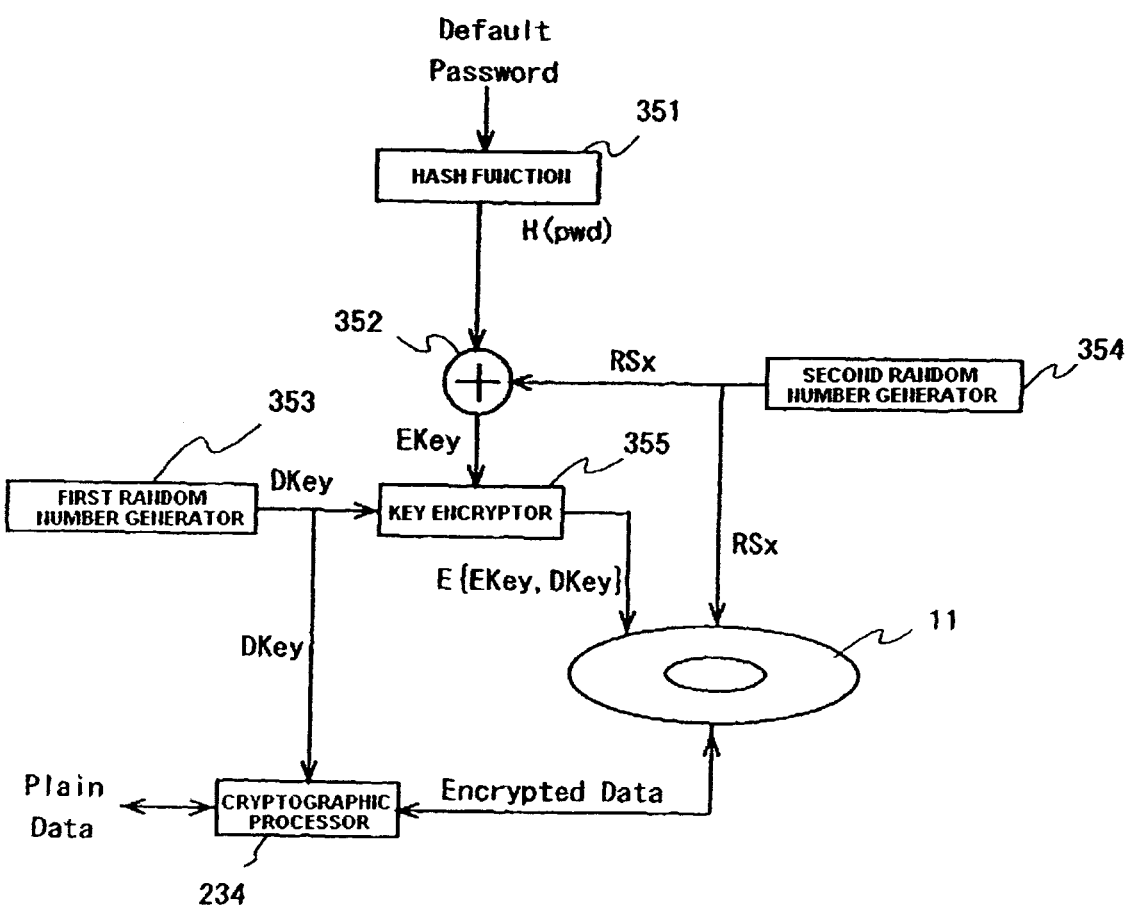
FIG. 3 is a block diagram showing operations or components for performing the operations in first generating a data cryptographic key DKey or updating the data cryptographic key DKey in the HDD according to one embodiment.

FIG. 3 is a block diagram depicting steps and components for generating first the data cryptographic key DKey in the HDD1 or updating the data cryptographic key DKey. In FIG. 3, each of a hash function 351, an XOR calculator 352, a first random number generator 353, a second random number generator 354, and a key encryption processor 355 is implemented by operation of the MPU 235 according to firmware. The data generated by these operations are temporarily stored in a register (memory) in the MPU 235. A part of these operations may be performed by a logic circuit in the HDC/MPU 23.

A random number generated by the first random number generator 353 becomes a new data cryptographic key DKey used in the HDD. The generated data cryptographic key DKey is set to the cryptographic processor 234 to be used in cryptographic operation of user data. The key encryption processor 355 encrypts the data cryptographic key DKey. In the HDD 1, this encrypted data cryptographic key E{EKey, DKey} is stored.

The key cryptographic key EKey for encrypting the data cryptographic key DKey is generated from a default password (Default Password) preset within the HDD 1 and a random number RSx. Specifically, a hash function 351, which is a one-way function, generates the hash value H(pwd) of the default password (Default Password). Then, the second random number generator 354 generates a random number RSx. The XOR calculator 352 calculates the XOR of the hash value H(pwd) of the default password (Default Password) and the random number RSx. The result is the key cryptographic key EKey.

The magnetic disk 11 retains E{Ekey, DKey} which is generated by encrypting the data cryptographic key DKey with the key cryptographic key EKey. The magnetic disk 11 also retains the random number RSx which has been used in generating the key cryptographic key EKey. Since the password which is user authentication information has not been set yet at that time, the MPU 235 temporarily uses the default password (Default Password) until the password of authentication information is set.

The generation of the key cryptographic key EKey may utilize the first random number generator 353 for generating the data cryptographic key. It may also use a value which has been preliminarily retained in the magnetic disk 11 before generating the data cryptographic key DKey. This value may be generated within the HDD 1 or may be preliminarily stored in the magnetic disk 11 in manufacturing the HDD 1.

Since the generated data cryptographic key DKey is set in the cryptographic processor 234, the cryptographic processor 234 encrypts write data and decrypts read data to output in recording and reproducing user data to and from the magnetic disk 11. Accordingly, data in the magnetic disk 11 are protected in the encrypted state. Since the data cryptographic key DKey can be updated securely like this, updating the data cryptographic key can invalidate data using the former data cryptographic key.

Figure 4:
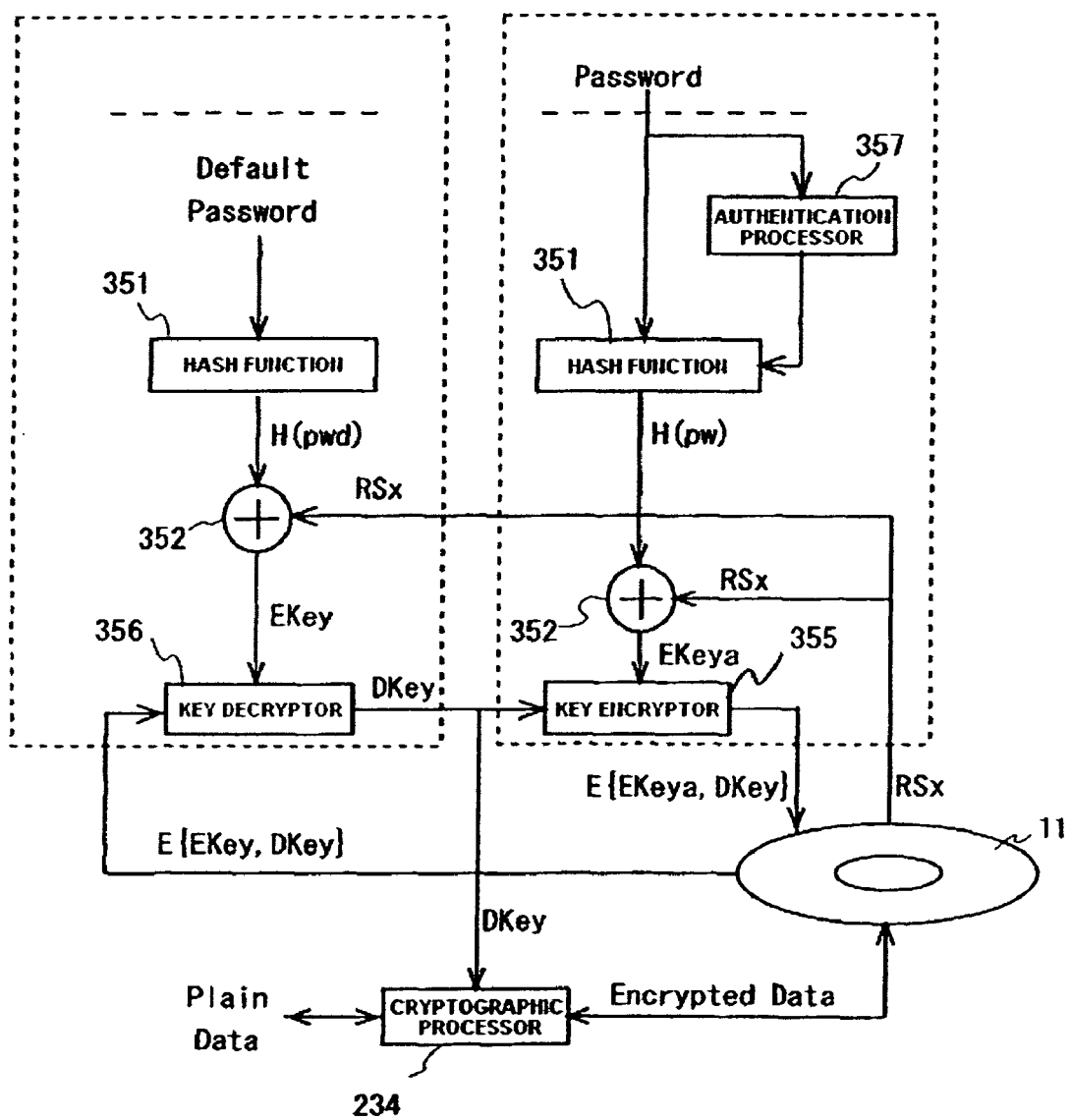
FIG. 4 is a block diagram showing operations or components for performing the operations in setting a password in the HDD by a user in the HDD according to one embodiment.

Next, referring to FIG. 4, setting a password to the HDD by a user will be explained. In FIG. 4, a plurality of blocks denoted by the same reference symbols are shown. These are shown for clarity in explanation and the blocks with the same reference symbol are the same components. For example, the two blocks denoted by the hash functions 351 are the same hash function. This is the same in the following description.

When a user inputs a password (Password) through the host 51 to set the password in the HDD 1, the authentication processor 357 performs authentication. The MPU 235 functions as an authentication processor 357. The authentication processor 357 executes a predetermined calculation on the password (Password) to set it in the HDD 1 as authentication data. The authentication by the authentication processor 357 is based on a conventional method and details thereof are omitted.

In response to a normal end of the authentication by the authentication processor 357, the hash function 351 generates a hash value H(pw) from the inputted password (Password). Then, the XOR calculator 352 calculates the XOR of the hash value H(pw) and the random number RSx fetched from the magnetic disk 11. This XOR is a new key cryptographic key EKeya.

The hash function 351 also generates a hash value H(pwd) of the default password (Default Password). The XOR calculator 352 calculates the XOR of the hash value H(pwd) and the random number RSx fetched from the magnetic disk 11. This value is the present key decryption key EKey before being updated. The key decryption processor 356 uses the present key cryptographic key EKey to decrypt the encrypted key cryptographic key E{Ekey, DKey} retained in the magnetic disk 11. This provides the data cryptographic key DKey. The MPU 235 functions as a key decryption processor 356.

The key encryption processor 355 encrypts the data cryptographic key DKey with the key cryptographic key EKeya to generate E{EKeya. DKey} and stores it in the magnetic disk 11. Update of the password and the key cryptographic key ends with the foregoing processes. In the foregoing processes, the data cryptographic key DKey is not changed. The cryptographic processor 234 performs encryption and decryption using the same data cryptographic key DKey as before. Or, it may use not the random number RSx stored in the magnetic disk 11 but a random number newly generated at this time by the second random number generator 354 so as to perform an XOR with the new hashed password H(pw). Namely, the key cryptographic key is updated with a new password and a new random number. Here, the newly generated random number is retained in the magnetic disk 11.

Figure 5:
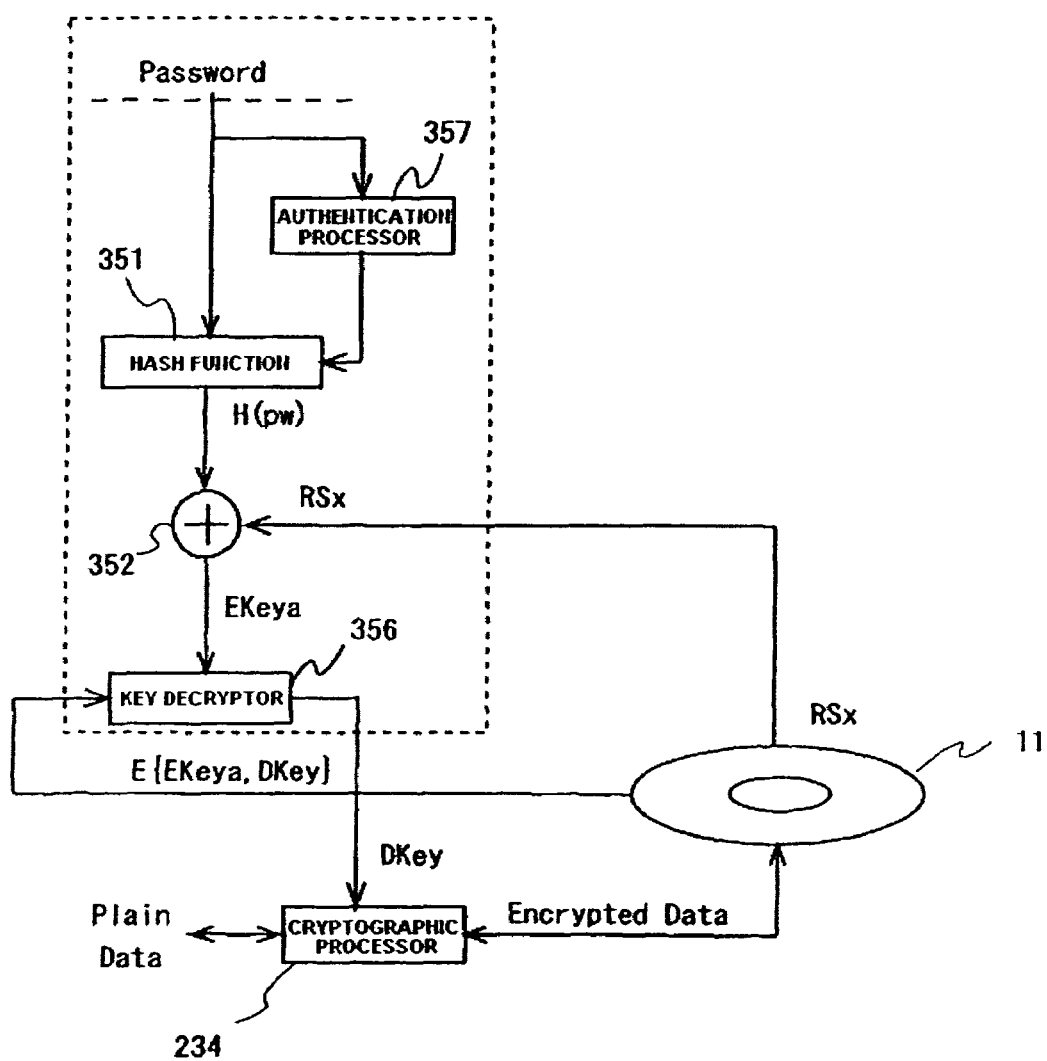
FIG. 5 is a block diagram showing operations or components for performing the operations in using the HDD with a password set by a user in the HDD according to one embodiment.

FIG. 5 depicts a sequence in the case that a user uses an HDD with a password set. The user inputs a password (Password) for his or her own authentication into the HDD 1 via the host 51. The authentication processor 357 performs authentication in a specific manner. In response a normal end of the authentication, the hash function 351 generates a hash value H(pw) from the inputted password (Password). Further, the random number RSx is fetched from the magnetic disk 11 and the XOR calculator 352 calculates an XOR of the hashed password H(pw) and the random number RSx. The calculated value is a key for cryptography EKeya.

The key decryption processor 356 fetches the encrypted data cryptographic key E{EKeya, DKey} retained in the magnetic disk 11 and decrypts the encrypted data cryptographic key E{EKeya, DKey} with the generated key for cryptography EKeya. Thereby the data cryptographic key DKey is obtained. Moreover, the key decryption processor 356 sets this data cryptographic key DKey to the cryptographic processor 234.

Thereby, inputted information is encrypted, output information is decrypted to be output, and information on the magnetic disk 11 is protected in an encrypted state. If the password (Password) for user's authentication has not been set, input of the authentication password (Password) and the authentication are omitted and the same operation can be performed with the default password (Default Password) within the HDD 1.

Figure 6:
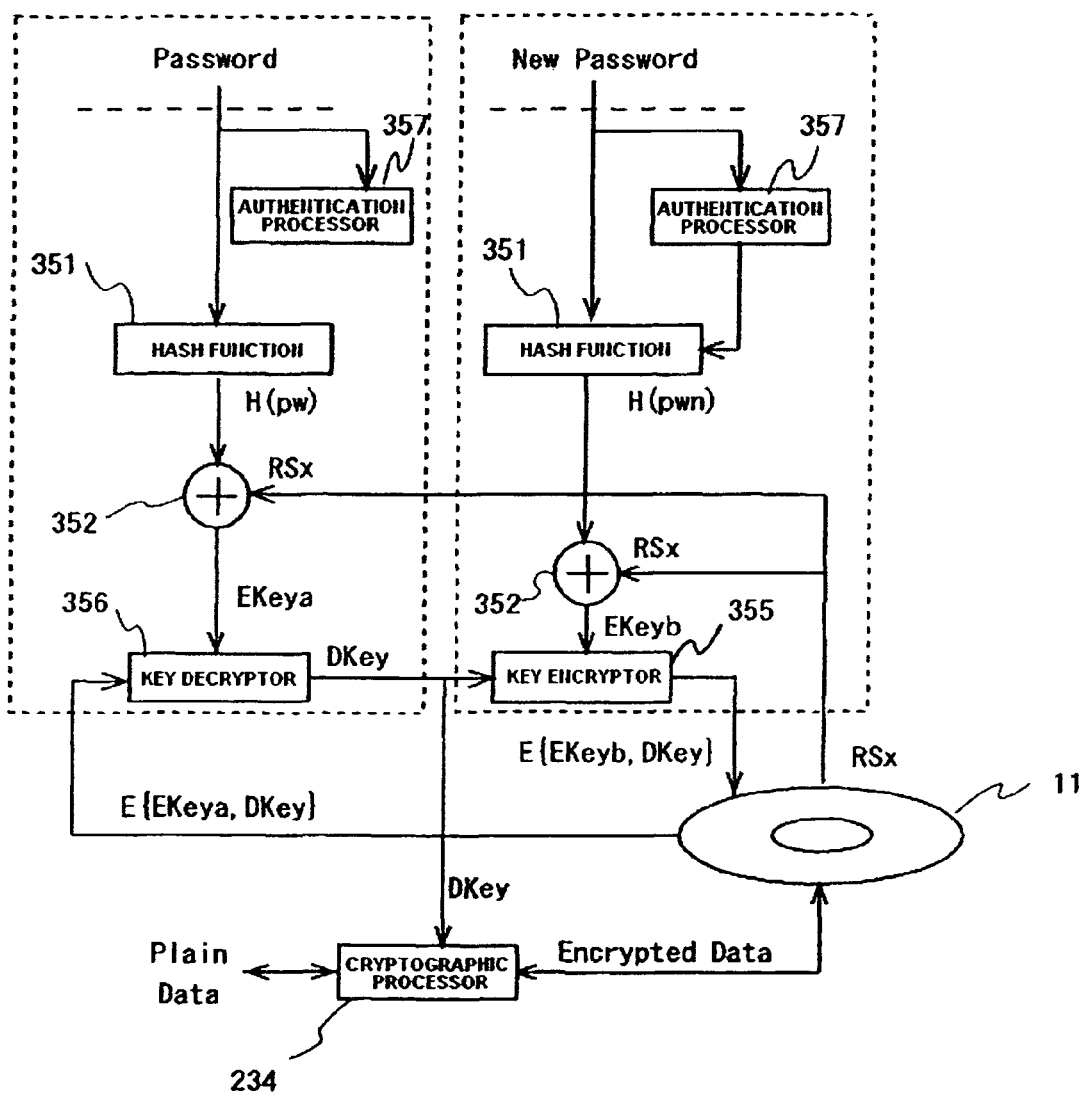
FIG. 6 is a block diagram showing operations or components for performing the operations in changing (updating) a password for the HDD 1 by a user in the HDD according to one embodiment.

Next, referring to FIG. 6, operation for a user to change (update) the password for the HDD 1 will be described. As described referring to FIG. 5, the MPU 235 reproduces the data cryptographic key EKeya from the password (Password) before updated. Specifically, the MPU 235 reproduces the data cryptographic key EKeya using the XOR calculation of the hash value H(pw) of the authenticated password (Password) and the random number RSx fetched from the magnetic disk 11. Then, it decrypts the encrypted data cryptographic key E{EKeya, DKey} fetched from the magnetic disk 11 using the key cryptographic key EKeya to obtain a data cryptographic key DKey.

Moreover, the MPU 235, as described referring to FIG. 4, updates the key cryptographic key using the new password (New Password) and encrypts the data cryptographic key with the updated key cryptographic key to store it in the magnetic disk 11. Specifically, when the authentication has ended normally, the XOR calculator 352 calculates the XOR of the hash value H(pwn) of the new password and the random number RSx fetched from the magnetic disk 11. This becomes a new key cryptographic key EKeyb. The key encryption processor 355 obtains the data cryptographic key DKey decrypted by the key decryption processor 356 and encrypts it with the updated new key cryptographic key EKeyb. The encrypted data cryptographic key E{EKeyb, DKey} is retained in the magnetic disk 11. The update of the password and the key cryptographic key ends with these operations.

Figure 7:
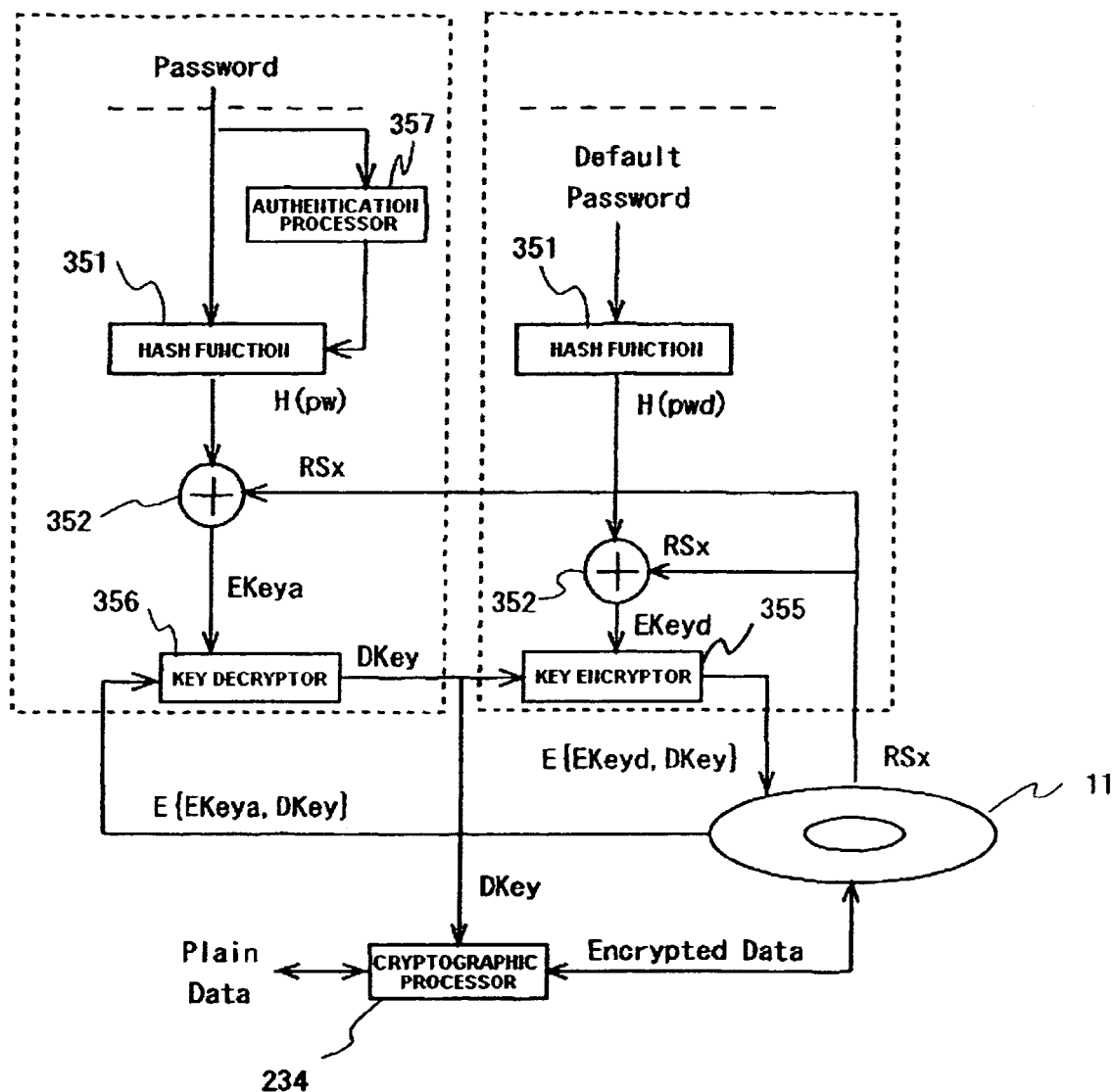
FIG. 7 is a block diagram showing operations or components for performing the operations in deleting the password for the HDD 1 by a user in the HDD according to one embodiment.

FIG. 7 schematically shows operations in the case that a user deletes a password for the HDD 1. First, as described referring to FIG. 5, the MPU 235 reproduces the data cryptographic key DKey from the password before updated. Then, the MPU 235 performs settings with the default password (Default Password) as described referring to FIG. 3.

Specifically, the MPU 235 calculates the XOR of the hash value H(pwd) of the default password (Default Password) and the random number RSx retained in the magnetic disk 11 to generate a key cryptographic key EKeyd. In this step, the random number RSx retained in the magnetic disk 11 is reproduced, but may be newly generated. Next, the MPU 235 encrypts the decrypted data cryptographic key DKey using a newly generated key cryptographic key EKeyd. The newly encrypted data cryptographic E{EKeyd, Dkey} is retained in the magnetic disk 11.

Figure 8:
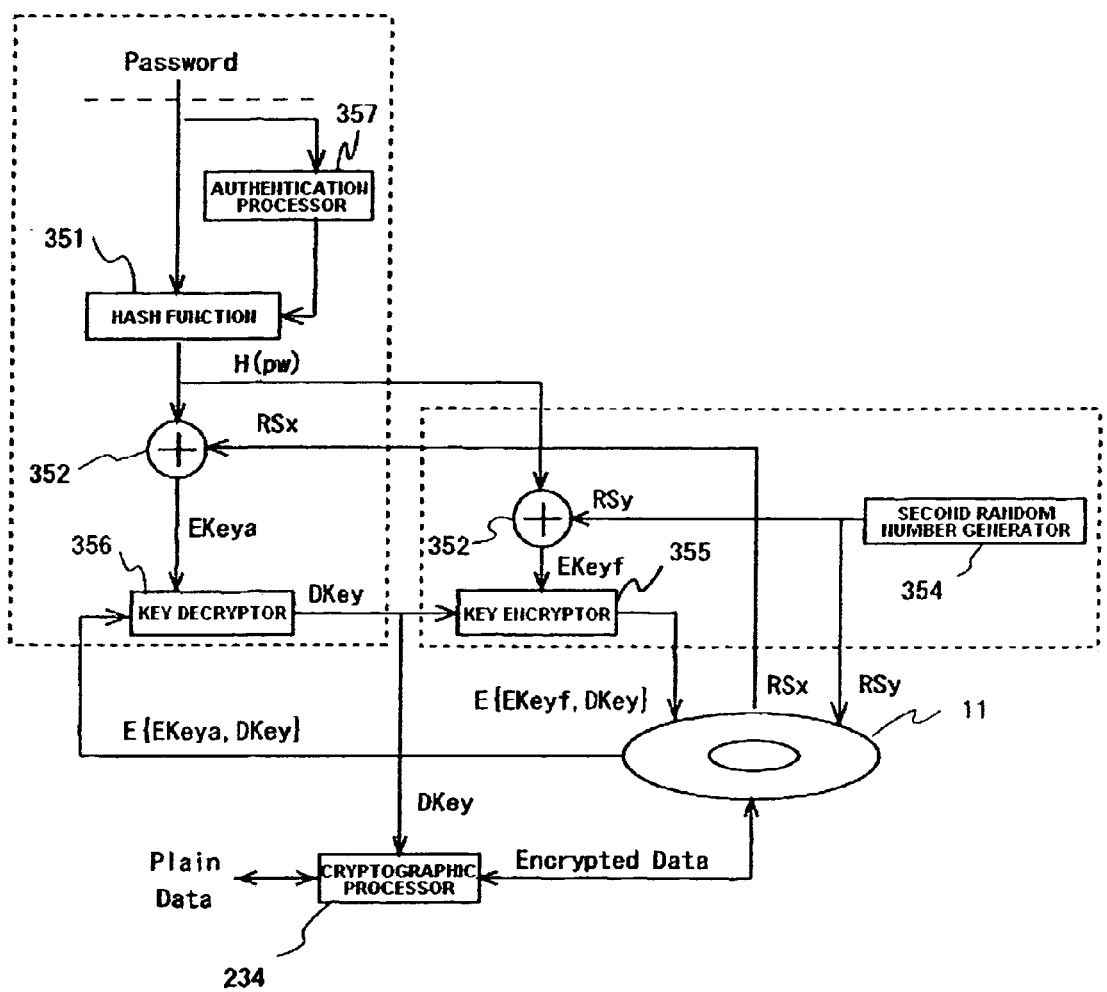
FIG. 8 is a block diagram showing operations or components for performing the operations in updating the random number RSx and a key cryptographic key generated from the random number in the HDD according to one embodiment.

Subsequently, referring to FIG. 8, an update sequence of the random number RSx and a key cryptographic key generated from the random number will be explained. First, the MPU 235, as described referring to FIG. 5, reproduces the data cryptographic key DKey. Namely, input of the password (Password) by the user, authentication thereof, generation of the key cryptographic key EKeya using the password (Password) and the random number before being updated, and decryption of the data cryptographic key DKey with the key cryptographic key EKeya are ended.

Next, the first random number generator 354 generates a new random number RSy to update the random number RSx. The newly generated random number RSy is retained in the magnetic disk 11. Moreover, the XOR calculator 352 calculates the XOR of the newly generated random number RSy and the hash value H(pw) of the password. The result becomes an updated key cryptographic key EKeyf.

The key encrypter 355 encrypts the data cryptographic key DKey using the updated key cryptographic key EKeyf. Then, the key encrypter 355 stores the encrypted data cryptographic key E{EKeyf, DKey} in the magnetic disk 11. This updating the random number enables the encrypted data cryptographic key E{EKeyf, DKey} retained in the magnetic disk 11 to be updated without changing the password.

As for timings to update the random number, some preferred examples can be proposed. Specifically, the random number may be updated at a timing when the operating time (power-on time) of the HDD 1 exceeds a reference value after updating the random number or the key cryptographic key, at a timing when the number of commands received from the host 51 exceeds the reference value after updating the random number or the key cryptographic key, or every time when the authentication is performed.

It is important to deal with an abnormal access to the encrypted data cryptographic key E{EKey, DKey} from the external in order to securely manage the data cryptographic key DKey in the HDD 1. In normal use of the HDD 1, the data cryptographic key E{EKey, DKey} will not be accessed from the external. Therefore, if an abnormal access which is out of the predetermined regulation arises, that means a high risk of leakage of the user data. Therefore, if an abnormal access arises from the external to the data cryptographic key E{EKey, DKe}, the MPU 235 updates the present key cryptographic key to re-encrypt the data cryptographic key using the new key cryptographic key. This improves security in the data cryptographic key and the data on the magnetic disk 11.

Figure 9:
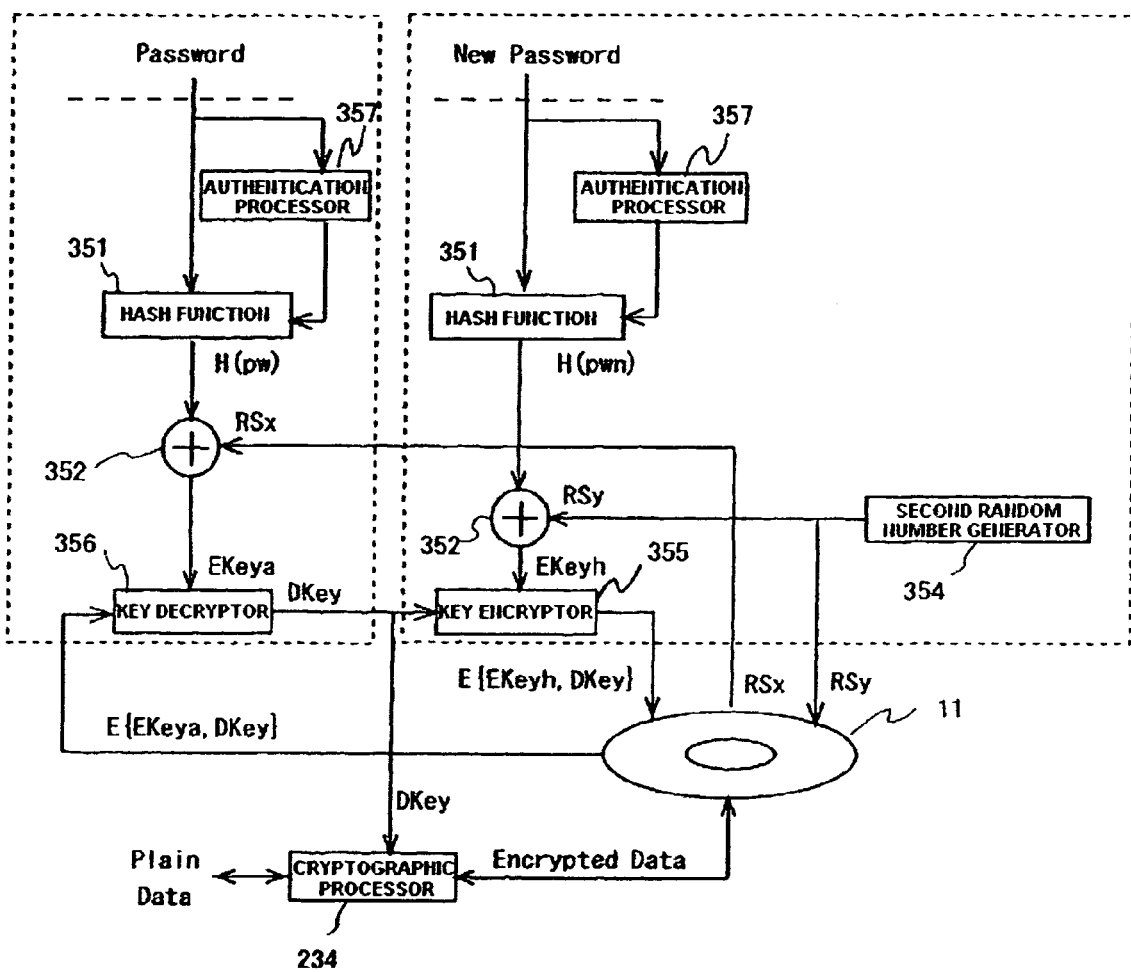
FIG. 9 is a block diagram showing operations or components for performing the operations in updating the password and the random number concurrently in the HDD according to one embodiment.

Subsequently, another preferred example of updating the random number will be explained. FIG. 9 schematically shows operations in case that the password and the random number are updated concurrently. The MPU 235 performs update of the password (Password) according to the operations described referring to FIG. 6. Specifically, the XOR calculator 351 calculates the XOR of the hash value H(pw) of the present password (Password) and the present random number RSx. The result is the present key cryptographic key EKeya. The key decryptor 356 reproduces the data cryptographic key DKey using the present key cryptographic key EKeya.

Next, the user inputs a new password (New Password) via the host 51 in order to set a new password in the HDD 1. Through the authentication by the authentication processor 356, the new password (New Password) is set in the HDD 1 as authentication data in the specific manner, which may be a conventional one. In response to a normal end of the authentication, the hash function 351 of a one-way function generates a hash value H(pwn) of the inputted new password (New Password).

In order to update the random number RSx, the first random number generator 354 generates a new random number RSy. This new random number RSy is retained in the magnetic disk 11. Then, the XOR calculator 351 calculates the XOR of the hash value H(pwn) of the new password and the new RSy. The result becomes a new key cryptographic key EKeyh. The key encrypter 355 encrypts the data cryptographic key DKey using the new updated key cryptographic key EKeyh.

The encrypted data cryptographic key E{Ekeyh, DKey} is newly retained in the magnetic disk 11. These operations achieve concurrent update of the password and the random number so that the key cryptographic key and the encrypted data cryptographic key retained in the magnetic disk 11 are updated. Update of both of the password and the random number achieves securer management of the data cryptographic key DKey.

Figures 10A, 10B:
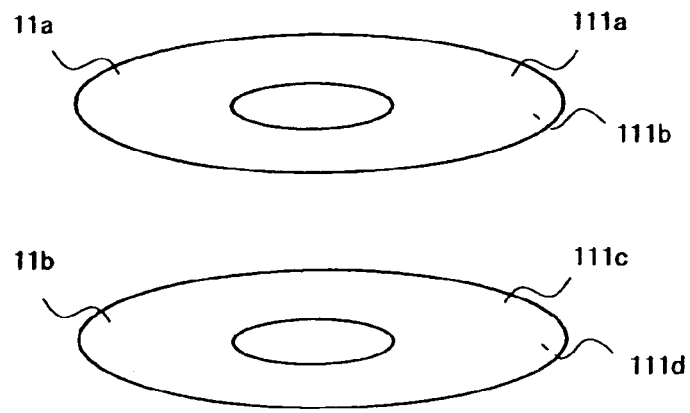
FIGS. 10(a) and 10(b) are diagrams schematically showing an example in which the data storage region is divided into a plurality of segments and a data cryptographic key corresponding to each segment is used in the HDD according to one embodiment.

In the above example, the HDD 1 retains one data cryptographic key inside of it. However, in order to improve the security, it is preferable that the data storage area is divided into a plurality of segments and a data cryptographic key corresponding to each of the segments is used. For example, as shown in FIGS. 10(a), and 10(b), the HDD 1 has data cryptographic keys corresponding to each of the recording surfaces of the magnetic disk 11. In the example of FIG. 10, the HDD 1 has two magnetic disks 11a and 11b, and the magnetic disks 11a and 11b each have two recording surfaces 111a to 111d.

The HDD 1 has different data cryptographic keys DKey_1 to DKey_4 for each of the recording surfaces 111a to 111d. In addition, different key cryptographic keys EKey_1 to EKey_4 are related to each of the recording surfaces 111a to 111d. Accordingly, the encrypted keys for data corresponding to the recording surfaces 111a to 111d are E{EKey_1, DKey_1} to E{EKey_4, DKey_4}, respectively. The MPU 235, in a read and a write operations, generates key cryptographic keys and encrypts and decrypts the data cryptographic keys corresponding to the recording surfaces where the subject user data are stored as described referring to FIGS. 2 to 9. Typically, the same value to each segment is used for the passwords. The way to divide the data recording area is not limited to the above example. For example, zones on each recording surface may be used as segments.

As set forth above, according to one embodiment, data leakage from an HDD including direct access to data on the magnetic disk and the like can be avoided by encrypting user data and properly managing cryptographic keys therefore. Encrypting the data cryptographic key securely retains the user data within a data storage device to utilize the data. Further, parameters relating to the retention of the cryptographic keys can be desirably changed so that the cryptographic key can be kept to be securely retained.

As set forth above, the present invention is described by way of certain embodiments but is not limited to the above embodiments. A person skilled in the art can easily modify, add, and convert the each element in the above embodiments within the scope of the present invention. For example, embodiments of the present invention may be applied to a data storage device having a medium different from a magnetic disk. Or, it may be applied to a data storage device performing either one of recording and reproducing data. In this case, the cryptographic processor performs either one of encryption and decryption.

Necessary data such as encrypted data cryptographic key may be stored in a non-volatile memory other than a magnetic disk. The random number in the above description may include a pseudo random number or a random number table may be used to obtain the random number. The internal data to generate a data cryptographic key or a key cryptographic key are not limited to a random number. A password to be used in generating a data cryptographic key may be data different from the password to be used in authentication. Or, the authentication may be omitted depending on the design and may use key generation external data other than a password to generate the key cryptographic key.

What is claimed is:

1. A hard disk drive data storage device comprising:
   an enclosure;
   a spindle motor fixedly coupled within said enclosure;
   at least one magnetic disk fixedly coupled with said spindle motor, said at least one magnetic disk being a medium for storing encrypted data;
   a key cryptographic processor for generating a key cryptographic key using external key generation data received from a host and internal key generation data stored inside the data storage device, and decrypting a data cryptographic key stored inside the data storage device in encrypted a data cryptographic key using the key cryptographic key;

a data cryptographic processor for performing a cryptographic operation on data in the medium using decrypted said the data cryptographic key; and an authentication processor for performing authentication using the external key generation data as a password, wherein the key cryptographic processor generates the key cryptographic key using the password used in the authentication if the authentication has been normally performed, wherein if the password is changed, the key cryptographic processor generates the key cryptographic key with changed the password and renewed the internal key generation data, and encrypts the data cryptographic key using generated said the key cryptographic key.

2. The data storage device according to claim 1, further comprising a random number generator, wherein the internal key generation data is a random number generated by the random number generator.

3. The data storage device according to claim 1, wherein the key cryptographic processor renews the key cryptographic key changing the internal key generation data.

4. The data storage device according to claim 3, wherein if the encrypted and stored data cryptographic key is accessed from an external, the key cryptographic processor renews the key cryptographic key changing the internal key generation data.

5. The data storage device according to claim 1, wherein a data storage region of the medium has a plurality of divided sections; and plural data cryptographic keys corresponding to each of the plurality of divided sections are encrypted and stored inside the data storage device using plural key cryptographic keys generated from each different plural internal key generation data.

6. A management method of a data cryptographic key in a hard disk drive data storage device performing a cryptographic operation of data in a medium, said method comprising:

providing an enclosure;

fixedly coupling a spindle motor within said enclosure;

fixedly coupling at least one magnetic disk with said spindle motor, said at least one magnetic disk being a medium for storing encrypted data;

receiving external key generation data from a host;

generating a key cryptographic key using the external key generation data and internal key generation data stored inside the data storage device;

decrypting the data cryptographic key stored inside the data storage device in encrypted the data cryptographic key using the key cryptographic key;

performing the cryptographic operation of data in the medium using the decrypted data cryptographic key; and performing authentication using the external key generation data as a password, wherein if the authentication has been normally performed, the key cryptographic key is generated using the password used in the authentication, wherein if the password is changed, the key cryptographic key is generated with changed the password and renewed the internal key generation data, and the data cryptographic key is encrypted using generated said the key cryptographic key.

7. The management method according to claim 6, wherein the data storage device further comprises a random number generator; and the internal key generation data are a random number generated by the random number generator.

8. The management method according to claim 6, wherein the key cryptographic key is changed by renewing the internal key generation data.

9. The management method according to claim 8, wherein if the encrypted and stored data cryptographic key is accessed from the external, the key cryptographic key is changed by renewing the internal key generation data.

10. The management method according to claim 6, wherein a data storage region in the medium has a plurality of divided sections; and plural data cryptographic keys corresponding to each of the plurality of divided sections are encrypted by using plural key cryptographic keys generated from each different plural internal key generation data and is stored inside the data storage device.

* * * * *